May 26, 1970  W. L. STEINER ET AL  3,514,535
DISPLAY STORAGE TUBE UTILIZING A THERMOPLASTIC FILM
FOR RECORDING THE INFORMATION
Filed Dec. 9, 1966

INVENTORS
WILFORD L. STEINER
FRIEDRICH DINHOBEL
BY: Oldham & Oldham
ATTORNEYS

United States Patent Office 3,514,535
Patented May 26, 1970

3,514,535
DISPLAY STORAGE TUBE UTILIZING A THERMO-PLASTIC FILM FOR RECORDING THE INFORMATION
Wilford L. Steiner, Akron, Ohio, and Friedrich Dinhobel, Ann Arbor, Mich., assignors to Goodyear Aerospace Corporation, Akron, Ohio, a corporation of Delaware
Filed Dec. 9, 1966, Ser. No. 600,495
Int. Cl. H04n 5/74, 5/82
U.S. Cl. 178—7.5                                4 Claims

ABSTRACT OF THE DISCLOSURE

An information storage apparatus utilizing the properties of thermoplastic film for storing information and a Schlieren optic system for presenting the stored information as a display which may be used in conventional correlation systems.

---

Figure 1:
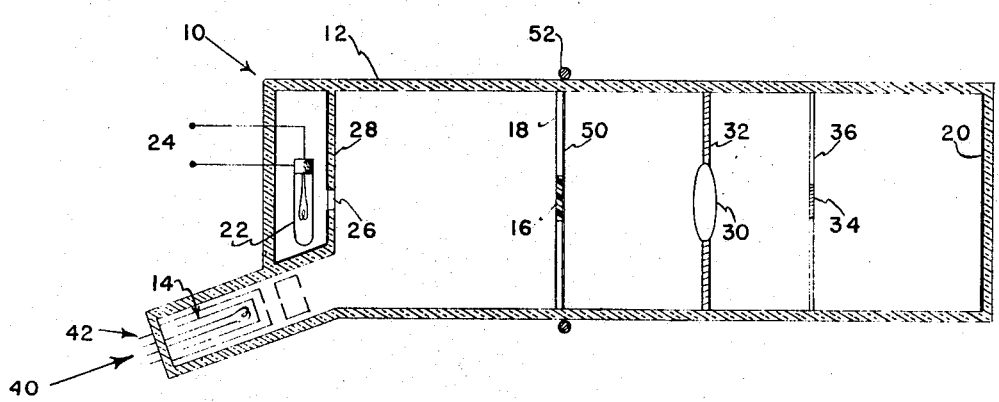

This invention relates to a display storage tube, and more particularly, to a storage tube where an image can be stored electronically for an indefinite period of time on a thermoplastic film, and projected onto an optical viewing screen, as desired without destroying the stored qualities of the electronic image. Also, the tube is adaptable for use in the correlation of data on a simultaneous area basis.

For many correlators based on area matching, a continuous tone display storage tube is a necessary part. At present all available tubes of this kind have the following limitations:

(1) Signals of equal amplitude are displayed with different intensities as a function of location on the tube face, thereby limiting the number of gray shades that can be identified.

(2) Resolution is limited by the storage mesh, the spot size of of a high current writing beam, light scattering in the phosphor, and dispersion between the storage screen and phosphor. Additional distortions are also introduced by the collector screen.

(3) Storage time is limited, evidenced by a washing out of the display during viewing.

(4) Satisfactory operation is extremely sensitive to tube element voltage adjustment.

It is the general object of the present invention to avoid and overcome the foregoing and other difficulties of and objections to prior art practices by the provisions of a display storage tube utilizing a thermoplastic film for electronic image storage which equally displays all different intensities so that when the image is projected there is virtually no limit to the number of gray shades that can be identified.

A further object of the invention is to provide a thermoplastic film as a high resolution electronic image storage surface, and the image as projected onto a display screen is not distorted.

A further object of the invention is to provide a display storage tube where an electronic image is stored on a thermoplastic film by painting the film with a modulated electronic beam, and where the image storage may be permanent, and will not wash out when the image is projected by light onto a viewing screen.

A further object of the invention is to provide a display storage tube where voltage requirements are not extremely critical in order to achieve good electonic image storage and subsequent optical viewing thereof.

A further object of the invention is to provide a display storage tube where an electronic image may be stored on a thermoplastic film and when displayed, can be compared with a reference scene to provide a correlation function.

A further object of the invention is to provide a transparent thermoplastic film to receive and store an electronic image so that brigh light sources may be used for projecing the image with very little light energy absorbed to cause destruction of the image by heat, since the thermoplastic is transparent.

A further object of the invention is to provide a thermoplastic film for storage of an electronic image where an erase heat pulse of about twice the energy used in the development process permits the charge pattern to penetrate through the film and be dissipated with the surface tension of the film smoothing the surface to eliminate all evidence of previously stored information.

The aforesaid objects of the invention and other objects which will become apparent as the description proceeds are achieved by providing in a display storage tube the combination of a cylindrically shaped enclosed tube, a transparent thermoplastic film operatively mounted inside the tube, an electron gun discharging a modulated electron beam to place an image as a negative electronically charged pattern on the surface of the thermoplastic film, a viewing screen at one end of the tube, and means to project light through the thermoplastic film so the image stored thereon is focused onto the viewing screen.

Figure 2:
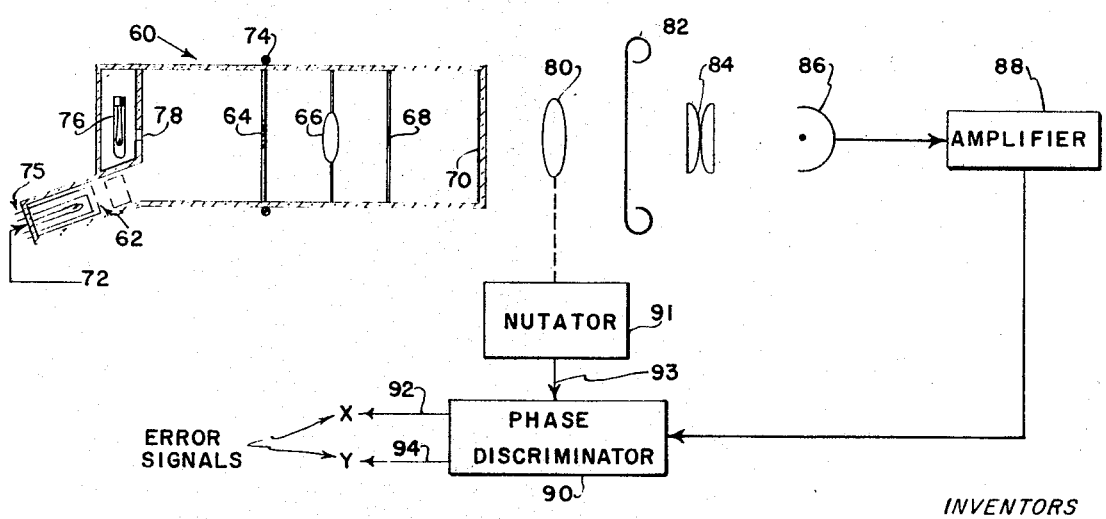

For a better understanding of the invention reference should be had to the accompanying drawings wherein:

FIG. 1 is a cross sectional schematic viewing of a preferred embodiment of the display storage tube of the invention; and FIG. 2 is a schematic block diagram of a possible system to utilize the display storage tube of FIG. 1 in a correlation process.

With reference to the form of the invention illustrated in FIG. 1, the numeral 10 indicates generally a display storage tube comprising a substantially cylindrically shaped tube body 12 having an electron gun 14 directed thereinto at one end. The electron gun 14 projects and modulates an electron beam to impinge upon a transparent thermoplastic target film 16 operatively held in position to the tube 12 by a substantially circular ring 18. A viewing screen 20 is operatively positioned at the other end of the tube body 12 and contains a frosted glass surface for displaying the optical image.

In order to project an electronic image stored on the transparent thermoplastic target film 16 as an optical image on the viewing screen 20, a Schlieren optical system is provided. This system consists of a light source 22 actuated from a voltage source 24 to project through a small aperture 26 in a housing 28 containing the light source 22. The light directed through the aperture 26 projects through the transparent film 16 and is focused by a lens 30 operatively held in position with relation to the tube body 12 by means of a circular supporting ring 32. The lens 30 focuses the aperture onto the light stop 34 operatively mounted with respect to the tube body 12. Thus, the relief image on the thermoplastic film 16 is projected in focus onto the viewing screen 20.

In order to write or place an electronic image onto the thermoplastic target film 16, an electron beam provided by the electron gun 14 is modulated by an input electrical signal 40. This modulated electron beam is caused to scan the thermoplastic target film 16 in a raster pattern and thus establishes thereon a charge pattern corresponding to the image information represented by the electrical signal. About 5,000 electrons per picture element are required to write information on the thermoplastic film. It is contemplated that the thermoplastic target film 16 will comprise about 1 TV frame, and since there are about 300,000 picture elements in one TV frame, $5,000 \times 300,000$ or $1.5 \times 10^9$ electrons would be used. The beam current for writing at standard TV speed would be $30 \times 1.5 \times 10^9$ or $4.5 \times 10^{10}$ electrons per second which is equivalent to about $8 \times 10^{-9}$ amperes of peak current. A typical accelerating potential for the electronic modulated beam is 12 kv., and at this value there is generated an unmeasurably small amount of secondary emission electrons. As a result there is established a negative charge pattern on the surface of the thermoplastic film. This negative charge pattern represents the stored input image which will be projected onto the viewing screen 20. These above stated voltage and current values are only approximations. Actually an electron image can be stored on the target fim without exactly following these values.

However, in order to actually achieve some distortions to the thermoplastic target film 16 which will be visible as an optical image on the viewing screen 20, it is necessary to develop the film. In other wards, to make the written information on the thermoplastic film, i.e. the negative charge pattern, suitable for display, the charge pattern must be converted into surface deformations by a development process. To do this, a positive potential of 50 to 300 volts is applied to a transparent conductive coating 50 through ring 52 operatively mounted to the tube body 12. Simultaneously with the positive potential, the film 16 is heated by applying a power pulse for several milliseconds duration to the conductive coating 50. The film 16 then softens and allows the coulomb forces resulting from the negative electron charge pattern to produce corresponding wrinkles in the film.

Then, as explained above, the stored information represented by the wrinkles in the film, can be displaced by the Schlieren optics with the film acting as the specimen. When the thermoplastic film 16 is illuminated uniformly, an exact optical image of the stored information is projected onto the viewing screen. Since the film 16 is transparent the light projection therethrough will not cause destruction of the image stored thereon by heat.

In order to erase the stored information on the thermoplastic target film 16, a heat pulse of about twice the energy used in the development process applied to the conductive coating 50 permits the charge pattern stored in the film 16 to penetrate through the film and dissipate through the conductive coating 50. The inherent surface tension in the film 16 will smooth the surface eliminating all evidence of the previously stored information.

The invention contemplates that the thermoplastic film 16 will be polystyrene of about 5 to 15 microns in thickness with the conductive coating 50 being any suitable transparent conductive material, and having a thickness of about 1 micron. The ring 18 mounting the film 16 in position is generally made from a thin non-conductive material of about the same thickness as the film 16.

The tube body 12 should be under a vacuum of about $10^{-4}$ torr for proper operation. The length of an electron trajectory from the electron gun 14 onto the thermoplastic target film 16 should be a small fraction of the mean free path. In a vacuum of $10^{-4}$ torr, there is a mean free path equal to about 20 inches between air molecules and a mean free path of about 110 inches between electrons and air molecules, which will be more then sufficient to eliminate scattering of the electrons. Although this is a relatively poor vacuum, it will have no serious effect on the cathode 42 of the electron gun 14 because of the very low beam current requirement.

For a better understanding of how the tube 10 of FIG. 1 can be used in a correlation system, reference should be had to FIG. 2 wherein a tube 60 contains an electron gun 62, a thermoplastic target film 64, a focusing lens 66, a light stop 68 and a viewing screen 70. Present electronic input information 72 is provided into the receiving electrodes 75 of the electron gun 62 and is projected onto the thermoplastic target film 64, all in the manner more specifically described above. The image as it appears on the screen 70 is focused via lens 80 onto the reference film 82 containing previously prepared images.

Light from the tube display transmitted through the reference film is collected by lens 84 onto the photo-multiplier 86 which generates an electrical signal proportional to the transmitted light intensity. The electron signal is amplified in the amplifier 88 and this amplified signal is then sent to a phase discriminator 90 which also accepts an input signal 93 from a nutator 91 to determine the X and Y error signal 92 and $9\theta$ respectively. These error signals may be utilized to automatically position the reference film 82 in order to achieve registration of the tube display image with the film reference image, all in the well-known manner of correlation techniques.

Thus, it is seen that the objects of the invention have been achieved by providing an electronic display storage tube to provide high-speed electronic storage of high resolution pictures for subsequent display at high brightness levels for an unlimited length of time. The apparatus consists of an electron gun projecting a modulated electron beam onto a thermoplastic target film, a light source, a Schlieren optics system including an aperture and a light stop to project the input image stored on the thermoplastic target film onto a viewing screen. The image stored on the thermoplastic target film is developed by heating the film slightly. The stored image is erased by heating the film with about twice as much energy as the amount necessary for development. The input image may be stored on the thermoplastic target film for an indefinite period of time. The tube is readily adaptable for projection of an input image onto a reference image to provide a correlation function.

While only the best known embodiment of the invention has been illustrated and described in detail, it is to be particularly understood that the invention is not limited thereto or thereby, but that the inventive scope is defined in the appended claims.

What is claimed is:

1. A display storage tube which comprises an evacuated enclosure, means at one end of the tube for displaying an image, means at the other end of the tube to generate a modulated electron beam, transparent thermoplastic film which will receive an electron charge pattern mounted between the above stated means inside the tube, a conductive coating associated with the transparent thermoplastic film to receive a positive potential and simultaneously a pulse to heat and soften the film by allowing coulomb forces to produce wrinkles in the film corresponding to the negative electron charge pattern impinged thereon, a ring operatively mounted externally to the tube body and electrically connected to the conductive coating to receive and pass to the conductive coating a power pulse sufficient to allow the electron charge pattern to pass through the film and onto the conductive coating for dissipation, and Schlieren optical means to focus an image of the charge pattern on the display means.

2. A display tube according to claim 1 which includes a reference image, means to project the image formed on the display means onto the reference image, and means to effect correlation between the image on the display means and the reference image.

3. A tube according to claim 1 wherein the Schlieren optical means comprises a light source mounted inside the tube at the end thereof adjacent the means to generate a modulated electron beam, an aperture mounted between the light source and the thermoplastic film to direct illumination to the thermoplastic film, a lens mounted between the thermoplastic film and display means for focusing, and a light stop mounted between the lens and the display means to block out the focused aperture.

4. A tube according to claim 3 where the means to generate the electron beam is an electron gun, and where the tube has an axis with the Schlieren optical means aligned with the axis, but with the electron gun mounted adjacent the light source at an angle to the axis of the tube.

References Cited

UNITED STATES PATENTS

| | | |
|---|---|---|
| 3,063,872 | 11/1962 | Boldebuck. |
| 3,131,019 | 4/1964 | D'Antonio. |
| 3,400,382 | 9/1968 | Kurzweil. |
| 3,063,331 | 11/1962 | Glenn. |
| 3,290,674 | 12/1966 | Calhoon _____ 315—12 |

OTHER REFERENCES

N. E. Wolff: A Photoconductive Thermoplastic Recording System, June 1964, vol. 25, No. 2, pp. 200–208.

ROBERT L. GRIFFIN, Primary Examiner

J. A. ORSINO, Jr., Assistant Examiner

U.S. Cl. X.R.

178—6.6, 7.87, 7.88